US008294886B1

(12) United States Patent
Diver, Jr.

(10) Patent No.: US 8,294,886 B1
(45) Date of Patent: *Oct. 23, 2012

(54) ALIGNMENT METHOD FOR SOLAR COLLECTOR ARRAYS

(75) Inventor: Richard B. Diver, Jr., Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 266 days.

This patent is subject to a terminal disclaimer.

(21) Appl. No.: 12/689,798

(22) Filed: Jan. 19, 2010

Related U.S. Application Data

(63) Continuation-in-part of application No. 11/761,396, filed on Jun. 12, 2007, now Pat. No. 7,667,833.

(60) Provisional application No. 61/241,047, filed on Sep. 10, 2009, provisional application No. 60/817,160, filed on Jun. 28, 2006.

(51) Int. Cl.
*G01B 11/26* (2006.01)

(52) U.S. Cl. ........................................ 356/138

(58) Field of Classification Search ............... 356/152.2, 356/138; 136/246; 126/602; 372/9
See application file for complete search history.

(56) References Cited

U.S. PATENT DOCUMENTS

| 5,977,906 | A * | 11/1999 | Ameen et al. ................. 342/174 |
| 6,597,709 | B1 | 7/2003 | Diver, Jr. |
| 6,899,096 | B2 | 5/2005 | Nakamura |
| 6,984,050 | B2 | 1/2006 | Nakamura |
| 7,207,327 | B2 | 4/2007 | Litwin et al. |

| 2009/0249787 | A1 | 10/2009 | Pfahl et al. |
| 2010/0265602 | A1 | 10/2010 | Lata Perez |
| 2011/0000478 | A1 | 1/2011 | Reznik |

OTHER PUBLICATIONS

Andraka, et al., "Improved Alignment Technique for Dish Concentrators", Proceedings of ISEC 2003, 2003 International Solar Energy Conference; Hawaii, Mar. 2003, pp. 1-9.
Richard L. Wood, "Distant Observer Techniques for Verification of Solar Concentrator Optical Geometry", Solar Energy Research Institute, 1981, UCRL-53220.
M.K. Selcuk, "Parabolic Dish Test Site: History and Operating Experience", Prepared for USDOE through NASA by Jet Propulsion Laboratory, JPL Publication 85-18.
F. R. Livingston, "Activity and Accomplishments in Dish/Stirling electric Power System Development," Prepared for USDOE through NASA by Jet Propulsion Laboratory, JPL Publication 85-8.
T. Wendelin, "Parabolic Trough Optical Characterization at the National Renewable Energy Laboratory," DOE/Solar Program Review Meeting, 2004, DOE/GO-102055-2067, pp. 328-329.

(Continued)

*Primary Examiner* — Tarifur Chowdhury
*Assistant Examiner* — Isiaka Akanbi
(74) *Attorney, Agent, or Firm* — Olivia J. Tsai

(57) ABSTRACT

The present invention is directed to an improved method for establishing camera fixture location for aligning mirrors on a solar collector array (SCA) comprising multiple mirror modules. The method aligns the mirrors on a module by comparing the location of the receiver image in photographs with the predicted theoretical receiver image location. To accurately align an entire SCA, a common reference is used for all of the individual module images within the SCA. The improved method can use relative pixel location information in digital photographs along with alignment fixture inclinometer data to calculate relative locations of the fixture between modules. The absolute locations are determined by minimizing alignment asymmetry for the SCA. The method inherently aligns all of the mirrors in an SCA to the receiver, even with receiver position and module-to-module alignment errors.

15 Claims, 3 Drawing Sheets

OTHER PUBLICATIONS

Eckhard Lupfert et al, "Parabolic Trough Analysis and Enhancement Techniques," Proceedings of ISEC2005, 2005 International Solar Energy Conference, Orlando, FL, pp. 1-7.

Hank Price et al, "Advances in Parabolic Trough Solar Power Technology," Journal of Solar Energy Engineering, May 2002, vol. 124 pp. 109-125.

J. B. Blackmon et al, "Application of the Digital Image Radiometer to Optical Measurement and Alignment of Space and Terrestrial Solar Power Systems," 28$^{th}$ Intersociety Energy Conversion Engineering Conference Proceedings, IECEC 1993, pp. 2.563-2.570.

R.B. Diver et al, "A New High-Temperature Solar Research Furnance," Journal of Solar Energy Engineering, vol. 105 (1983) pp. 288-293.

M. Shortis et al "Photogrammetry: An Available Surface Characterization Tool for Solar Concentrators, Part II: Assessment of Surfaces", Journal of Solar Energy Engineering, 1997, vol. 119, pp. 286-291.

Richard B. Diver, "Mirror Aligment and Focus of Point-Focus Solar Concentrations" Proceedings of the 1995 ASME/JSME/JSES, International Solar Energy Conference, Maui, HI.

B. L. Butler et al, "Optical Evaluation Techniques for Reflecting Solar Concentrators" SPIE vol. 114 Optics Applied to Solar Energy Conversion (1977), pp. 43-49.

Bridgette J. Steffen et al, "Development and Characterization of a Color 2F Alignment Method for the Advanced Dish Development System", Proceedings of ISEC, International Solar Energy Conference, Hawaii (2003).

Tim Wendelin et al, "Optical Evaluation of Composite-Based Reflector Facets for Parabolic Trough Concentrators", Solar 2004 Conference, Jul. 11-14, Portland, OR, pp. 1-5.

Frank Biggs, et al, "The Helios Model for the Optical Behavior of Reflecting Solar Concentrators" SAND76-0347, 1979.

John A. Duffie et al, "Solar Energy thermal Processes", John Wiley & Sons.

Timothy A. Moss et al, "Final Test Results for the Schott HCE on a LS-2 Collector", SAND2005-4034.

Richard B. Diver, "Mirror Alignment Techniques for Point-Focus Solar Concentrators", SAND92-0668.

Vernon E. Dudly, et al "Test Results SEGS LS-2 Solar Collector" SAND94-1994.

Richard Hartley et al, *Multiple View Geometry in Computer Vision, Second Edition*, Cambridge University Press, 2003, Chapter 10, 3D Reconstruction of Cameras and Structure, pp. 262-278.

\* cited by examiner

ALIGNMENT METHOD FOR SOLAR COLLECTOR ARRAYS

CROSS-REFERENCE TO RELATED APPLICATIONS

This application claims the benefit of U.S. Provisional Application No. 61/241,047, filed Sep. 10, 2009, which is incorporated herein by reference. This application is a continuation-in-part of U.S. application Ser. No. 11/761,396, filed Jun. 12, 2007 now U.S. Pat. No. 7,667,833, which claims the benefit of U.S. Provisional Application No. 60/817,160, filed Jun. 28, 2006, both of which are incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to solar collectors and, in particular, to an improved alignment method for solar collector arrays comprising a plurality of parabolic trough solar concentrators.

BACKGROUND OF THE INVENTION

Parabolic trough solar concentrators have been developed, fielded, and are currently producing electricity in the United States and are in development in other nations. See H. Price et al., "Advances in Parabolic Trough Solar Power Technology," *ASME J. of Solar Energy Engineering* 105, 288 (2002); and V. E. Dudley et al., "Test Results: SEGS LS-2 Solar Collector," *SAND*94-1884, Sandia National Laboratories, Albuquerque, N. Mex. (1994). Trough concentrators use mirrored surfaces curved in a parabolic shape. The mirrors focus sunlight on a receiver tube, or heat collection element (HCE), running the length of the trough. In a trough power plant, oil runs through the HCE in the focal region where it is heated to high temperatures and then goes through a heat exchanger to generate steam. The steam is then used to run a conventional power plant.

Most trough concentrators use multiple mirror facets or panels that have to be aligned to the receiver, or HCE. Accurate mirror alignment of faceted solar concentrators maximizes the reflected sunlight intercepting the HCE and can enable the use of a smaller HCE, or the use of a larger aperture concentrator with the same size HCE, thereby improving overall collector efficiency. In addition, practical alignment can potentially reduce solar collector installation-fixture accuracy requirements and cost. However, a problem with trough concentrators has been the lack of accurate mirror alignment, preventing maximum energy efficiency.

Compared with parabolic dish concentrators, practical optical alignment techniques for the accurate alignment of parabolic trough concentrators have not been developed. The relatively short focal lengths and low operating temperature in parabolic trough systems have allowed them to be developed and commercialized with relatively inaccurate alignment by the use of fixtures. Their linear nature has also been a barrier to the development of practical optical techniques. Parabolic dishes, on the other hand, require precise alignment, especially to minimize flux hot spots on the solar receiver. In addition, the fact that the mirror normals of parabolic dishes conveniently point to the same general location (approximately one focal length behind the dish focus) facilitates alignment.

Accurate alignment of concentrating collectors by the use of fixtures is extremely difficult. These fixtures position the mirrors, typically at four mirror mounts. Because the mounts effectively define alignment based on one location, mirror alignment accuracy can be no better than the mirror slope error. Manufacturing tolerances, error stack-up and indeterminate effects, such as thermal expansion, make the use of fixtures challenging for precise large optical systems. For parabolic dishes, only optical techniques, which inherently account for error stack-up and other factors, have provided the required alignment accuracy. However, where optical techniques have been used to measure the alignment of fixture-aligned parabolic troughs, significant misalignment has been reported. Mechanical fixtures also do not lend themselves to checking alignment after installation.

Various optical techniques have been developed to align parabolic dishes. Distant observer and distant light source techniques have been developed to align parabolic dishes, lasers have been used to align solar furnace mirrors and parabolic dishes, and a video-based technique for mirror characterization and facet alignment has been developed and implemented. See F. R. Livingston, "Activity and Accomplishments in Dish/Stirling Electric Power System Development," *DOE/JPL*-1060-82, Pasadena, Calif. (1985); M. K. Selcuk, "Parabolic Dish Test Site: History and Operating Experience," *DOE/JPL*-1060-84, Pasadena, Calif. (1995); R. B. Diver et al., "A New High-Temperature Solar Research Furnace,"*ASME J. of Solar Energy Engineering*, Vol. 105, pp. 288-293 (1983); R. B. Diver, "Method and apparatus for aligning a solar concentrator using two lasers," U.S. Pat. No. 6,597,709; and J. B. Blackmon and K. W. Stone, "Application of the Digital Image Radiometer to Optical Measurement and Alignment of Space and Terrestrial Solar Power Systems," Paper No. 93217, *Proceedings of the 28th IECEC*, Atlanta, Ga. (1993). Variations on the distant light source technique have been further developed to enable near alignment and daylight alignment by the use of color targets and video cameras. See R. B. Diver, R. B., "Mirror Alignment Techniques for Point-Focus Solar Concentrators," *SAND*92-0668, Sandia National Laboratories, Albuquerque, N. Mex. (1992); R. B. Diver, "Mirror Alignment and Focus of Point-Focus Solar Concentrators," Solar Engineering 1995, *Proceedings of the ASME/JSME/JSES International Solar Energy Conference*, Maui, Hi. (1995); C. E. Andraka et al., "Improved Alignment Technique for Dish Concentrators," *International Solar Energy Conference Proceedings*, Kohala Coast, Hawaii Island, Hi. (2003); and B. J. Steffen et al., "Development and Characterization of a Color 2F Alignment Method for the Advanced Dish Development System," *International Solar Energy Conference Proceedings*, Kohala Coast, Hawaii Island, Hi. (2003). With these techniques, differences between theoretically calculated and optically measured image positions are used to guide alignment.

Despite the relatively advanced state of commercialization of parabolic troughs, optical alignment is undeveloped. One of the early concepts proposed utilizing reflected images in the mirrors, but it was never developed. See R. L. Wood, "Distant Observer Techniques for Verification of Solar Concentrator Optical Geometry", *UCRL*53220, Lawrence Livermore National Laboratory, Livermore, Calif. (1981). The use of lasers to statistically determine optical accuracy and mirror alignment has received the most attention, and an approach based on stereoscopic photography has shown promise. See T. Wendelin (2004); B. L. Butler and R. B. Pettit, "Optical Evaluation Techniques for Reflecting Solar Concentrators," *SPIE Vol.* 144 *Optics Applied to Solar Energy Conversion*, Society of Photo-Optical Instrumentation Engineers, Bellingham, Wash. (1977); E. Lupfort et al. (2005); and M. R. Shortis and G. Johnston, "Photogrammetry: An Available Surface Characterization Tool for Solar Concentrators, Part II: Assessment of Surfaces," *ASME J. of Solar Energy Engineering*, Vol. 119, pp. 281-291 (1997). The distant observer technique has been used to align LS-2 trough mirrors as part of its HCE performance characterization. See T. A. Moss and D. A. Brosseau, "Test Result of a Schott HCE Using a LS-2 Collector," *Proceedings of ISES*2005 2005 *International Solar Energy Conference*, Orlando, Fla. (2005). Unfortunately, trough spacing requirements do not permit the use of the distant observer technique within a trough field. The laser and stereoscopic techniques are also complex, require sophisticated equipment and setup, and are impractical for the staggering number of mirrors in a trough solar power plant.

A desirable mirror alignment method for any concentrating solar collector would: (1) be simple to set up and implement; (2) use a minimum of sophisticated hardware; (3) not require removal of the HCE receiver; (4) not require sun or other restrictive weather conditions; (5) not require line-of-sight to a distant observer or light source; and (6) permit accessibility to the mirrors for adjustments. See R. B. Diver (1995). The Theoretical Overlay Photographic Collector Alignment Technique (TOPCAT) method of the present invention provides these desirable features for aligning parabolic trough solar concentrators.

SUMMARY OF THE INVENTION

The present invention is directed to an improved method for establishing camera fixture location for aligning mirrors on a solar collector array (SCA) comprising multiple mirror modules. The TOPCAT method of the present invention aligns mirrors on a parabolic solar collector trough module by comparing the location of the receiver image in photographs with the predicted theoretical receiver image location. To accurately align an entire SCA with the TOPCAT method, a common reference is used for all of the individual module images within the SCA. The improved method can use relative pixel location information in digital photographs along with alignment fixture inclinometer data to calculate relative locations of the fixture between modules. The absolute locations are determined by minimizing alignment asymmetry for the SCA. With this approach the TOPCAT method inherently aligns all of the mirrors in an SCA to the receiver, even with receiver position and module-to-module alignment errors.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

Figure 1:
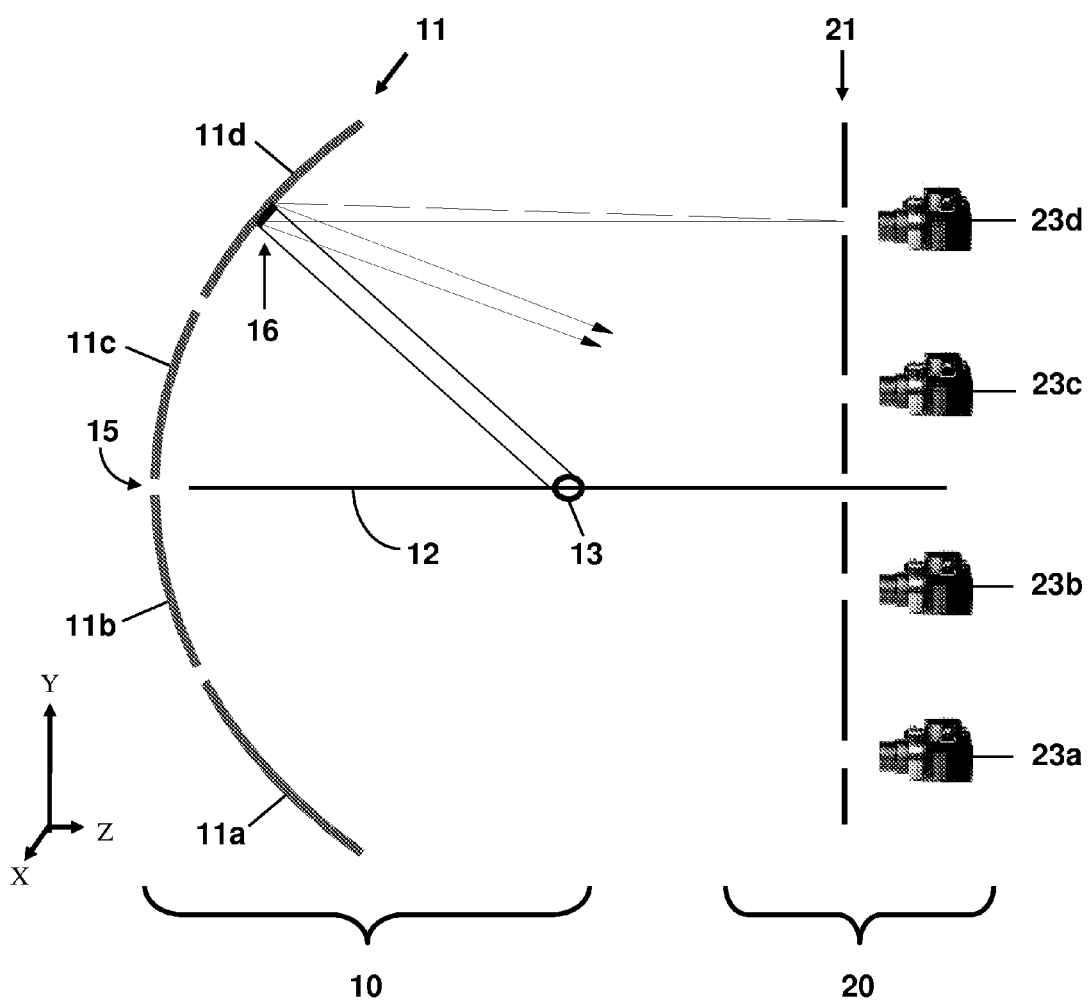
FIG. 1 shows a side-view schematic illustration of the TOPCAT method. Accurately positioned cameras on an alignment fixture measure the position of the HCE receiver image in a mirror. The mirror is aligned to superimpose the HCE image onto the theoretically calculated image position.

In FIG. 1 is shown a side-view schematic illustration of a parabolic collector 10 that illustrates the basic principles of the TOPCAT method of the present invention. The collector 10 comprises a line-focusing parabolic trough concentrator 11 and a linear receiver, or HCE 13. The parabolic axis 12 lies in the z direction, through the vertex 15 of the trough concentrator 11. Elevation is in the vertical y direction. The trough of the concentrator 11 and the length of the HCE 13 run in the horizontal x direction, out of the plane of the figure. The trough concentrator 11 comprises at least two rows of mirror facets or panels ("mirrors"). Each mirror row comprises one or more mirrors that are arranged serially in the x direction. For example, four rows 11*a-d* of mirrors are shown in FIG. 1. Adjacent mirrors in adjacent mirror rows can be arranged in columns. The rows and columns of mirrors form a concentrator module 11. A SCA can comprise a plurality of such modules. Light from a source (e.g., the sun) is reflected by the rows 11*a-d* of mirrors and received by the HCE 13. From basic geometric principles, the shape and location of the reflected HCE image 16 in each mirror can be predicted. Alignment is accomplished by adjusting the aim of each of the mirrors in the rows 11*a-d* so that the reflected HCE image 16 falls on the location of the theoretical HCE image in the overlay of the image for that mirror.

An exemplary alignment fixture 20 comprises at least one off-axis camera position 23*a*, *b*, *c*, and *d* for each row 11*a*, *b*, *c*, and *d* of the module 11 (e.g., camera position 23*d* corresponds to mirror row 11*d*). With the improved methodology, an on-axis middle camera position is not needed. The cameras can be positioned at any location where they can see a reflected image of the HCE in the corresponding mirror. Preferably, a camera is positioned such that the receiver image is in the center of the corresponding mirror to minimize effects due to improper mirror focal length on alignment. For example, the alignment fixture 20 can conveniently be a vertical pole 21 with the cameras accurately positioned along it at the positions 23*a-d* (alternatively, a single camera can be moved between camera positions 23*a-d*). The alignment fixture 20 can be placed at a convenient distance from the concentrator 11. For example, this distance can be close enough to be within the trough rows in a solar power plant, but far enough away so that a camera can see an entire module of mirrors. For alignment, the alignment fixture 20 is positioned perpendicular to the trough of the concentrator 11. As will be described below, for convenience the concentrator 11 can be pointed horizontally towards the alignment fixture 20. The concentrator 11 can be pointed horizontally (for example, ±1°) in elevation using open-loop tracking encoder feedback. The alignment fixture 20 can be positioned vertically (for example, ±2°) with inclinometers.

The alignment fixture 20 can be positioned vertically to align the center of the fixture with the optical axis 12 of the collector 10. This centering can be done by direct measurement of the alignment fixture using convention methods, such as mechanical measurements. Alternatively, a middle camera can be used to "boresight", or vertically center, the fixture using a boresight gauge mounted at the vertex of the concentrator module, as described in U.S. application Ser. No. 11/761,396. Alternatively, rather than use a boresight gauge, the fixture can be aligned with the trough and receiver by simply raising or lowering the fixture (i.e., in the y direction) until the receiver image appears in the center of the corresponding mirror row. One or more of the cameras can be used to facilitate the alignment. It is not necessary to precisely center the receiver images in the mirrors.

Once the alignment fixture location is determined, images from the cameras can then be used to align the mirrors in each of the rows of a column or set of columns. Each camera records the location of the HCE image in each mirror in a photographic image. Preferably, the photographic image is a digital image. The HCE image location in the photograph is then compared to a theoretical projected HCE image location by overlaying the two images. The theoretical overlays utilize the determined camera y locations. Vector algebra and projection theory can be used to predict the theoretical projected image for perfectly aligned mirrors, as described below. Each mirror is then adjusted to bring the measured photographic image to coincide with the theoretical projected image in the overlay. From geometry and the optical analysis, it is possible to predict the exact amounts of adjustment required. If optical errors other than focal length errors exist, photographs at multiple camera positions can be used to correct for these errors.

To align an entire SCA, the SCA remains in the same horizontal position while all of the images on a SCA are taken. Once the images of an entire SCA are taken, calculated images showing the theoretical location of the HCE in the mirrors are overlaid onto the photographs. A common reference for all of the individual module images within an SCA can be established by utilizing relative pixel location information in the digital photographs along with fixture inclinometer data to calculate relative locations of the alignment fixture between modules, as described below. The absolute locations can be determined by minimizing alignment asymmetry for the SCA. With this approach the TOPCAT method inherently aligns all of the mirrors in an SCA to the receiver, even with receiver position and module-to-module alignment errors.

Figure 2:
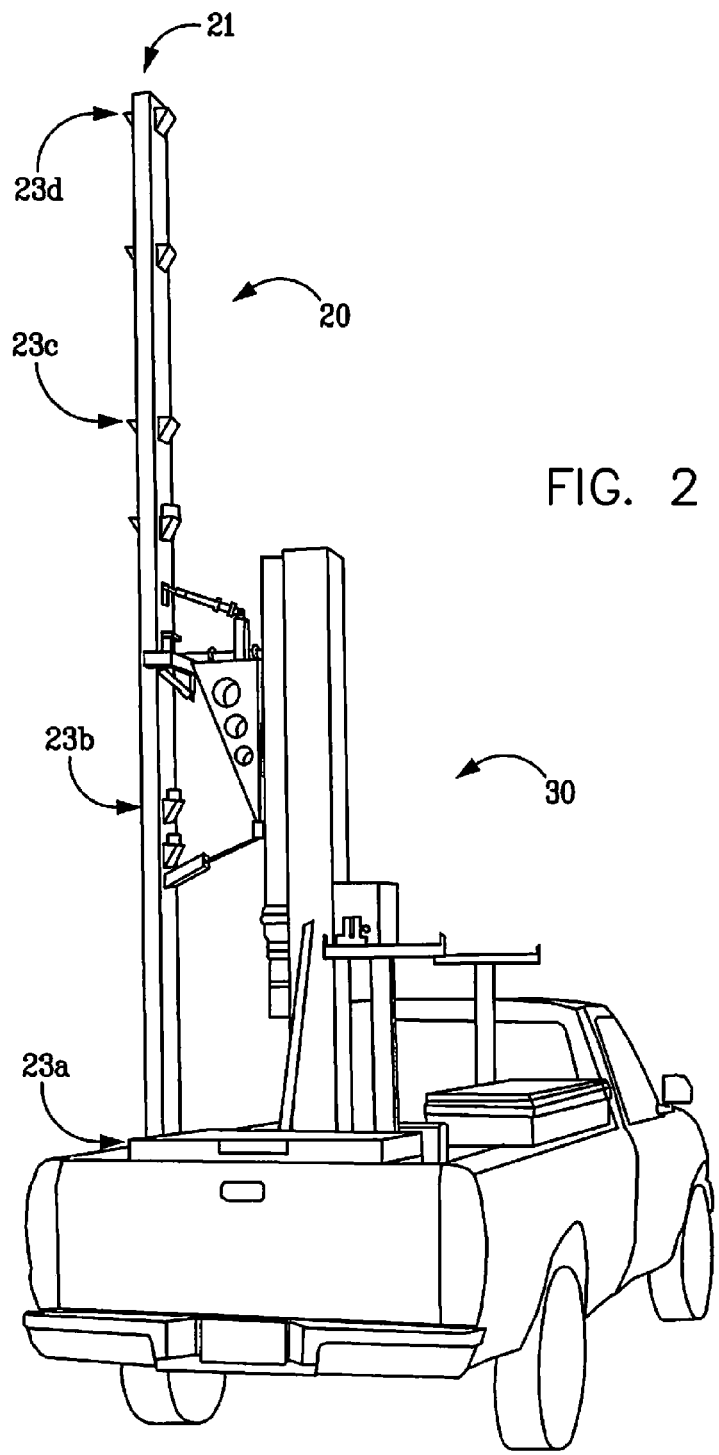
FIG. 2 shows a photograph of an alignment fixture mounted on a pickup truck.

FIG. 2 is a photograph of an alignment fixture mounted on the back of a pickup truck. For alignment, the alignment fixture is positioned perpendicularly to the trough at a distance from the SCA. Preferably for convenience, the SCA trough 30 is pointed horizontally, 0°, and the pickup truck-mounted alignment fixture 20 is positioned at a prescribed distance from the trough. The distance can be close enough to fit within the rows of troughs, but far enough away to view an entire mirror module comprising, typically, 5 to 7 columns of mirrors. The distance to the trough can be measured with an ultrasonic distance measurement instrument. To acquire alignment data, the truck driver can drive the fixture, stopping at each module to acquire data. The camera fixture can be articulated at its base to permit traveling under crossover piping at the end of the trough loops. When the fixture is centered on a module, the driver stops the truck and raises or lowers the fixture to center the receiver images in the mirrors and initiates the data acquisition process in which the fixture can be automatically leveled and the images acquired. When driving from module to module of the SCA, the correct distance to a trough can be maintained by monitoring the ultrasonic distance meter and the fixture is stopped when the entire module is within the field-of-view of the cameras. Alternatively, survey marks and other methods can be used to maintain the correct camera fixture to trough distance. Mirror alignment measurements are insensitive to camera to trough distances within approximately ±½ meter. The images can be processed later and the mirror alignment adjustments can be made later.

Calculation of the Theoretical Projected HCE Image

Ray tracing from a camera position, to a mirror, and then to the edges of the HCE can be used to calculate the theoretical location of the HCE image in the mirror and then draw a graphical projection of the image and mirrors as seen by the camera. The equations presented below are based on vector methods used in analytic geometry and are variations on equations used for the alignment of parabolic dishes. See R. B. Diver (1992) and R. B. Diver (1995).

Figure 3:
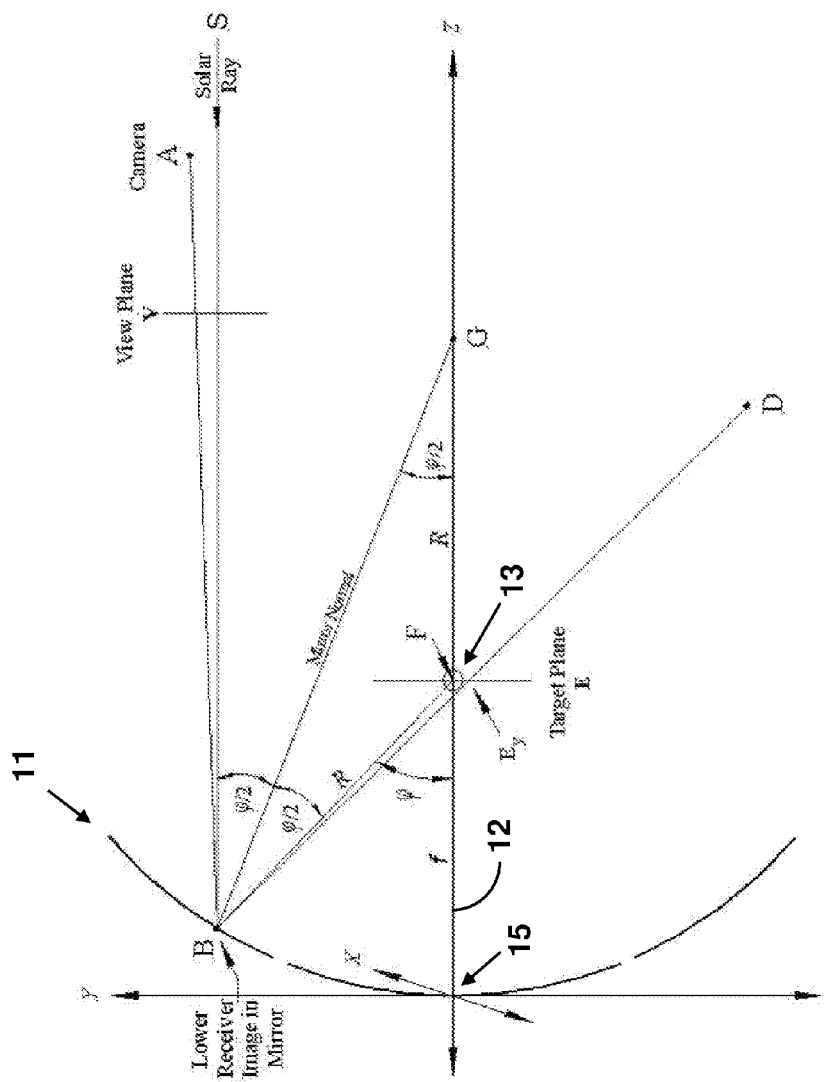
FIG. 3 shows a schematic illustration of the coordinate system and locations of the mirror, HCE, target, focus, camera, and the solar rays for calculating the lower HCE edge position in the mirrors.

Consider the coordinate system illustrated in FIG. 3. Alignment errors along the x-axis are not considered since the reflected rays still intercept the HCE receiver 13. Because the trough 11 has no curvature along the x-axis, the theoretical image of the HCE 13 is straight along the x-axis and the y and z image locations along the mirror rows are constant. Therefore, to determine the theoretical image location as viewed from an off-axis camera A, it is convenient to consider only the z and y vector components. In FIG. 3, the parabola vertex 15 is the origin and the x-axis is perpendicular to the plane of the figure. The focal line of the parabola is represented by a point F. For a parabolic concentrator, the vertex 15 can be defined as the middle of the trough 11, i.e., the intersection of a vertical line through the middle of the center column of mirrors and the horizontal line along the parabola vertex (x-axis). The z-axis is the optical axis 12 of the trough concentrator 11. A mirror location in space, B, is given by its coordinates ($B_x$, $B_y$, $B_y$); and the linear receiver 13 is parallel to the x-axis and perpendicular to the z-axis.

Utilizing the characteristics of the parabola, FIG. 3 shows that for a solar ray to be reflected from the sun S to the focus F, the mirror normal for a perfect parabola (vector BG) must bisect the angle SBF in the z-y plane, and the distance between points F and G is equal to the distance between points B and F. This relationship is true for all mirror positions B. Point G is at the intersection of the mirror normal and the z-axis and is different for each mirror y-position.

Useful equations for a parabola applied to the coordinate system in FIG. 3 are $$B_z = B_y^2/4f \text{ and} \tag{1}$$

$$R = 2f/(1+\cos \phi), \tag{2}$$

where f is the parabola focal length, R is the distance from the parabola to the focus in the z-y plane, and $\phi$ is the mirror position angle. See J. A. Duffie and W. A. Beckman, *Solar Energy Thermal Processes*, John Wiley & Sons, New York, N.Y., Chap. 8 (1974).

To determine the location of the image of the HCE lower receiver edge in the mirror B as seen by the camera A, the reflected vector BD from the mirror tangent to the bottom edge of the HCE receiver 13 can be iteratively calculated using the vector BA from the camera A to the mirror B and the mirror normal vector BG by the use of the following vector mathematics equation:

$$BD = 2\left[\frac{BA \cdot BG}{BG \cdot BG}\right]BG - BA \tag{3}$$

where the x, y, and z components of vectors BA and BG are $$BA_x = A_x - B_x, BA_y = A_y - B_y, BA_z = A_z - B_z, \text{ and} \tag{4}$$

$$BG_x = G_x - B_x, BG_y = G_y - B_y, BG_z = G_z - B_z, \text{ respectively.} \tag{5}$$

The dot products in Eq. (3) are $$BA \cdot BG = BA_x \times BG_x + BA_y \times BG_y + BA_z \times BG_z, \text{ and} \tag{6}$$

$$BG \cdot BG = BG_x \times BG_x + BG_x \times BG_x + BG_y \times BG_y + BG_z \times BG_z. \tag{7}$$

Eq. (3) is based on the law of reflection and has been derived for unit vectors by Biggs and Vittitoe. See F. Biggs and C. N. Vittitoe, "The Helios Model for the Optical Behavior of Reflecting Solar Concentrators," SAND76-0347, Sandia National Laboratories, Albuquerque, N. Mex. (1976). Note that vector BD, from Eq. (3), has the same magnitude as vector BA and that every mirror point along the theoretical parabola B has a unique mirror normal BG that can be determined from the characteristics of a parabola as discussed above.

The location of where vector BD intersects the target plane E (the plane through the center of the receiver perpendicular to the z-axis) corresponding to the bottom edge of the receiver is point $E_y$, and can be calculated by scaling the y component of vector BD in accordance with the z component, which is known. The scale factor between vector BE and vector BD, M, is therefore $$M = \frac{E_z - B_z}{D_z - B_z}, \quad (8)$$

and the y-coordinate at the target plane E, is $$E_y = B_y + M(D_y - B_y). \quad (9)$$

With this set of equations, the location on a mirror (point B) corresponding to where the reflected ray BD intersects the edge of the receiver can not be explicitly solved. It requires an iterative solution to find the mirror position B such that vector BD is tangent to the receiver. Furthermore, because a HCE receiver has a circular cross section (for this example), the effective y-location corresponding to where vector BD is tangent to the receiver depends on the angle in the z-y plane of vector BD. For the lower receiver edge image the effective target plane y-location $E_y$ is $$E_y = r/\cos(\phi + r/R), \quad (10)$$

where r is the HCE tube radius. R is the distance from the mirror B to the focus F in the zy plane from Eq. (2). For the upper receiver image, the effective target plane y-location $E_y$ is $$E_y = r/\cos(\phi - r/R) \quad (11)$$

The above equations when iteratively solved determine the y-location on the mirror $B_y$ corresponding to the bottom and top edge of the receiver as seen from the camera A. Because the parabolic trough has no curvature along the x-axis, the theoretical image of the receiver is straight along the x-axis. Assuming the receiver length is the same as the concentrator length, the theoretical x locations in the mirrors corresponding to receiver ends can also be iteratively calculated. Solving the above equations for both sides and ends of the receiver gives the theoretical edge locations on the mirrors of the reflected image as seen by the camera A of perfectly aligned parabolic mirrors.

The theoretical overlay is the calculated two-dimensional projection of the mirrors and theoretical receiver image (determined above) as seen by a camera at point A. Projection theory is used to calculate what a camera would see for a perfectly aligned mirror. In a camera, the projected image is inverted through lenses onto a detector. For this analysis, the mirror corner coordinates and receiver image corner coordinates are projected onto a view plane V between the camera A and mirror B. Because the theoretical image and photograph when overlaid are scaled to match dimensionally, the view plane position (and therefore the size of the theoretical overlay) is not important. In FIGS. 1 and 3 the camera is shown pointed parallel to the z-axis and perpendicular to the view plane V. In this case the x and y coordinates for the image and mirror corners in the view plane V can be calculated by simply scaling the x and y image and mirror coordinates to the relative z-component distances between the camera to view plane vector and camera to mirror or image point vectors. If the camera is pointed elsewhere, such as the parabola vertex, it is convenient to use Cartesian/cylindrical coordinate transformations to align the camera and view plane axis with the transformed z-axis to scale the view plane coordinates.

Method for Establishing Alignment Fixture Location for Theoretical Overlay Photographic Alignment of a Solar Collector Array The TOPCAT method described above aligns the mirrors on a parabolic solar collector trough module to the receiver by comparing the location of the receiver in photographs with their predicted theoretical location. However, in commercial parabolic trough solar power plants, a plurality of trough concentrator modules (typically, 6 to 12 modules) are driven by the common drive of a solar collector array (SCA). While bore sighting the camera fixture with the receiver and trough mirrors provides a convenient way to establish camera fixture location (y-position of point A in FIG. 3) relative to a trough module, there is no assurance that the receivers are precisely centered on the modules. In addition, because the camera alignment fixture is located several focal lengths away from the trough (to fit the module within the field-of-view of the cameras), small variations in receiver position can result in large uncertainties in camera location. There is also no assurance that all of the modules are aligned with each other, i.e., pointed parallel. As a result, the use of bore sighting references can result in camera positions with inconsistent y-locations along the SCA. These inconsistent fixture locations can adversely affect the alignment of mirror modules within an SCA.

Therefore, to accurately align an entire SCA with the TOPCAT method, it is desirable to use a common reference for all of the individual module images within the SCA. As an alternative to bore sighting, the improved method of the present invention uses information in the images along with fixture inclinometer data to establish a common coordinate system for an entire SCA and inherently align all of the mirrors in the SCA to the receiver, even with receiver position and module-to-module alignment errors. The following describes the steps of a method that can be used to establish a common camera y-coordinate system for the entire SCA. This approach can be done in conjunction with and iteratively with the theoretical overlay calculations described previously.

After the alignment fixture is positioned perpendicularly to the SCA trough, i.e., the trough is pointed horizontally and the alignment fixture is positioned vertically in this example, theoretical overlays of all of the mirror modules in the SCA are performed. For a first reference module, 1, assume that the fixture is centered at $y_1=0$, the design location. Therefore, for example, an LS-2 concentrator, the row 1 camera is at 1.97 m), the row 2 camera is at 0.729 m, the row 3 camera is at −0.729 m, and the row 4 camera is at −1.97 m. These are the y-locations of the cameras 23d, 23c, 23b, and 23a corresponding to the centers of the four mirrors 11d, 11c, 11b, and 11a, respectively. Any of the modules can be used for the reference module 1. For the remaining modules, the camera alignment fixture locations can be calculated by referencing it relative to the first module. Relative location can be determined by using the average y-pixel locations in the images of the top and bottom edges of the four mirror rows from the overlays and the inclinometer data from an inclinometer that measures fixture tilt in the direction towards the trough.

The average y-pixel locations of the modules, i, of each row, n, in an SCA, $Py_{i,n}$, are $$Py_{i1}=[Pyi_{1t}+Pyi_{1b}]/2 \quad (11)$$

$$Py_{i2}=[Pyi_{2t}+Pyi_{2b}]/2 \quad (12)$$

$$Py_{i3}=[Pyi_{3t}+Pyi_{3b}]/2 \quad (13)$$

$$Py_{i4}=[Pyi_{4t}+Pyi_{4b}]/2 \quad (14)$$

where $Pyi_{nt}$, and $Pyi_{nb}$ correspond to the average y-pixel locations of the top and bottom mirror edges, respectively, for an SCA having four individual mirror rows, n.

The alignment fixture locations for the other modules are calculated from the reference module, 1, using the average y-pixel locations and the fixture inclinometer data relative to the reference module.

$$y_i=y_1+\{[-S_{p1,4}[(Py_{i1}-Py_{11})+(Py_{i4}-Py_{14})]/2-D_{A1,4}(sinC_i-sinC_1)]+[-S_{p2,3}[(Py_{i2}-Py_{12})+(py_{i3}-Py_{13})]/2-D_{A2,3}(sinC_i-sinC_1)]\}/2 \quad (15)$$

where $S_{p1,4}$ is the vertical pixel scaling factor for rows 1 and 4, and $S_{p2,3}$ is the vertical pixel scaling factor for rows 2 and 3. The pixel scaling factors scale the pixel heights (in mm) at the camera to trough distance. For example, with 4 megapixel Gigabit Ethernet (GigE) cameras, $S_{p1,4}$ is 3.72 mm/pixel and $S_{p2,3}$ is 4.01 mm/pixel for the LS-2 with the alignment fixture at 7.62 m (25 feet) from the trough vertex. $C_1$ is the inclinometer reading in radians at module 1 and $C_i$ is the inclinometer reading in radians at module i. $D_{A1,4}$ is the average distance from the fixture to rows 1 and 4 (6.969 m for the LS-2 at 7.62 m, or 25 feet). $D_{A2,3}$ is the average distance from the fixture to rows 2 and 3 (7.531 m for the LS-2 at 7.62 m, or 25 feet).

Next, utilizing the camera locations calculated above, the TOPCAT analysis is performed and adjustments determined for the mirror mounts for the entire SCA. Adjustments are the amount of movement (mm) needed at each mount to bring the mirrors into alignment. Only one side of a mirror, top or bottom, will require adjustment.

Next, the outer and inner row asymmetries for the SCA are calculated. Asymmetry is the relative number (#) of mirror mount adjustment up or down. For a trough with 4 rows of mirrors with rows 1-4 corresponding to 11d-11a, respectively, in FIG. 1, the outer row asymmetry=(# row 1 outer mount mm adjustment)−(# row 1 inner mount mm adjustment)−(# row 4 outer mount mm adjustment)+(# row 4 inner mount mm adjustment). Likewise, the inner row asymmetry=(# row 2 outer mount mm adjustment)−(# row 2 inner mount mm adjustment)−(# row 3 outer mount mm adjustment)+(# row 3 inner mount mm adjustment).

From the inner and outer asymmetries, the heights (y-positions) of all of the camera fixture locations are iteratively increased or decreased by the same amount until overall mount asymmetry is within a small acceptable level. Other approaches for establishing the absolute fixture locations are possible. The amount of fixture adjustment needed can be determined from the outer and inner row asymmetries and the trough camera geometry and optical design. For example, for the LS-2 at 7.62 m (25 feet), the outer row adjustment=outer mount mm adjustment asymmetry/120 mount pairs per SCA×1.323 mrad/mm adjustment×13.99 mm/mrad. For the LS-2 at 7.62 m (25 feet), the inner row adjustment=inner mount mm adjustment asymmetry/120 mount pairs per SCA×1.260 mrad/mm adjustment×14.99 mm/mrad. The fixture adjustment=(outer row adjustment+inner row adjustment)/2.

Next, the alignment fixture adjustment is added to the assumed alignment fixture location for reference module 1 and the calculated relative alignment fixture locations for the other modules. Using the new fixture locations, the theoretical overlays, the mirror mount adjustments, and inner and outer washer asymmetry for the SCA are recalculated. The absolute fixture location can be adjusted until asymmetry is within a small acceptable level (e.g., 5 mm for the SCA).

Because with this improved method the theoretical overlays are based on a common reference for the SCA, receiver position errors have no influence on camera location. As a result, receiver displacement errors have the same impact on receiver image location as mirror tilt errors. The mirrors are, therefore, inherently aligned to the receiver even when it is not at the correct location. Similarly, module-to-module alignment errors have the same effect on receiver edge location as alignment errors. Small module-to-module errors should have little or no impact on referencing the camera alignment fixture to the mirrors in an SCA. Because the mirror adjustments are balanced up and down (i.e., asymmetry is minimized), tracking bias should not be significantly affected. The net result is that all major sources of error are inherently accounted for with this method and the mirrors are inherently aligned to the receiver.

To implement this method involves eliminating the bore sight camera.

Bore sighting can be accomplished at the beginning of each SCA by raising or lowering the camera fixture to center the receiver images in the mirror rows as seen in the cameras. The fixture can be repositioned at each module if receiver images are significantly out of the mirror centers because the ground is not level or module misalignment exists.

Because camera alignment fixture referencing is relative to the mirrors and 8 different mirror edges are averaged in each 4 row module, relative position can be very accurate, typically on the order of 1 pixel or less. The inclinometer repeatability needs to be about 0.05 degree or better to keep inclinometer induced errors to an acceptably small level. Inclinometer accuracy is not important but "noise" from fixture vibration, wind or vehicle movement impacts should be minimized.

Conversely, rather than use the above method for mirror alignment, the comparison of the theoretical and photograph images locations at multiple known y locations can also be used to characterize the optics of the trough, including alignment errors, slope errors, and other optical errors. The difference between the theoretical receiver image edge location and the photograph receiver image edge location indicates a quantifiable optical error corresponding to the receiver image location. By taking images at multiple known offsets across the full extent of the mirrors, the optical errors in the y direction can be quantified across the mirrors. Multiple cameras per row of mirrors or simply raising and lowering the fixture by measurable amounts and acquiring images can be used to acquire multiple y location images per mirror.

The present invention has been described as an improved alignment method for solar collector arrays. It will be understood that the above description is merely illustrative of the applications of the principles of the present invention, the scope of which is to be determined by the claims viewed in light of the specification. Other variants and modifications of the invention will be apparent to those of skill in the art.

I claim:

1. A method for alignment of a line-focusing parabolic trough solar concentrator module, comprising at least two rows and at least one column of mirrors, and a linear receiver, the method comprising:

(a) providing an alignment fixture comprising at least one off-axis camera position for each mirror row of the module;
(b) positioning the alignment fixture perpendicularly to the trough at a distance from the module;
(c) centering the alignment fixture relative to the optical axis of the trough;
(d) photographing the reflected image of the receiver in each mirror with the corresponding camera;
(e) calculating a theoretical projected image of the receiver in each mirror as seen by the corresponding camera; and
(f) adjusting each mirror to bring the theoretical projected image to overlay with the photographic image.

2. The method of claim 1, wherein the trough is pointed horizontally and the alignment fixture is positioned vertically in step (b).

3. The method of claim 2, wherein the trough is pointed horizontally using open-loop tracking encoder feedback.

4. The method of claim 2, wherein the alignment fixture is positioned vertically using at least one inclinometer.

5. The method of claim 1, wherein the alignment fixture is centered relative to the optical axis of the trough in step (c) by:
(a) assuming an alignment fixture location;
(b) calculating an alignment asymmetry for the module;
(c) calculating an alignment fixture adjustment for the module from the alignment asymmetry;
(d) adding the alignment fixture adjustment to the alignment fixture location to provide an adjusted alignment fixture location;
(e) recalculating the theoretical overlay projections for each mirror of the module using the adjusted alignment fixture location; and
(f) repeating steps (b) to (e) until the asymmetry is within an acceptable level.

6. The method of claim 1, wherein the alignment fixture is centered relative to the optical axis of the trough in step (c) using a boresight gauge.

7. The method of claim 1, wherein the alignment fixture is centered relative to the optical axis of the trough in step (c) using mechanical measurements.

8. A method for alignment of a solar collector array (SCA) comprising a plurality of line-focusing parabolic trough solar concentrator modules, each module comprising at least two rows and one column of mirrors, and a linear receiver, the method comprising:
(a) providing an alignment fixture comprising at least one off-axis camera position for each mirror row of the SCA;
(b) positioning the alignment fixture perpendicularly to the trough at a distance from the SCA;
(c) centering the alignment fixture relative to the optical axis of the trough until a reflected image of the receiver appears in a camera of the corresponding mirror row;
(d) photographing the reflected image of the receiver in each mirror of the module with the corresponding camera;
(e) moving the alignment fixture to a next module while maintaining the fixture to trough distance and repeating step (d) for each module;
(f) calculating relative alignment fixture locations for all of the photographic images;
(g) determining the theoretical projected image for each mirror of each module; and Diver (h) adjusting each mirror of each module to bring the theoretical projected image to overlay with the photographic image.

9. The method of claim 8, wherein the trough is pointed horizontally and the alignment fixture is positioned vertically in step (b).

10. The method of claim 9, wherein the trough is pointed horizontally using open-loop tracking encoder feedback.

11. The method of claim 9, wherein the alignment fixture is positioned vertically using at least one inclinometer.

12. The method of claim 8, wherein the reflected image in step (d) appears in the camera near the center of the corresponding mirror row.

13. The method of claim 8, wherein the fixture to trough distance is maintained in step (e) using an ultrasonic distance meter.

14. The method of claim 8, wherein the relative fixture locations for all of the individual module photographic images are calculated in step (f) by utilizing relative location information in the photographic images along with fixture inclinometer data to calculate relative locations of the alignment fixture between the modules.

15. The method of claim 8, wherein the determining step (g) comprises:
(a) assuming an alignment fixture location for a reference module;
(b) calculating an alignment asymmetry for the SCA;
(c) calculating an alignment fixture adjustment from the alignment asymmetry;
(d) adding the alignment fixture adjustment to the alignment fixture location for the reference module and relative alignment fixture locations to provide an adjusted alignment fixture location for each module;
(e) recalculating the theoretical projected image for each mirror of each module using the adjusted alignment fixture location for that module; and
(f) repeating steps (b) to (e) until the alignment asymmetry is within an acceptable level.

* * * * *